United States Patent Office 3,133,086
Patented May 12, 1964

3,133,086
OXA- AND THIA-DIAZEPINES
Werner Bossard, Riehen, near Basel, and Hans Bosshard and Hans E. Wegmüller, Basel, Switzerland, assignors to J. R. Geigy A.-G., Basel, Switzerland
No Drawing. Filed June 7, 1961, Ser. No. 115,303
Claims priority, application Switzerland June 8, 1960
7 Claims. (Cl. 260—327)

It has been found that cyclic axo compounds of the general Formula I

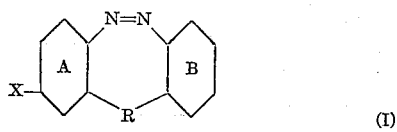

wherein
R represents the bridging members —O—, —S—, —N—, —CO— or

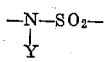

wherein Y is hydrogen or a possibly substituted hydrocarbon radical, and
X represents a nucleophilic group, and
A and B can contain further substituents and, possibly, fused ring systems, are obtained by diazotising an o-aminodiaryl compound of the general Formula II

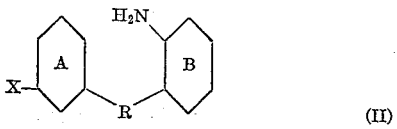

wherein X and R have the meanings given in Formula I and then coupling to form the cyclic azo compound.

In the above formulae, as well as in the other formulae exemplified in the specification, the double bonds in the aromatic carbocyclic rings have been omitted in accordance with the customary practice in the field of dyestuffs.

X, for example, represents the following groups: a secondary amino group such as, e.g. the methylamino, carboxymethylamino, ethylamino, propylamino, butylamino, amylamino, cyclohexylamino, benzylamino or phenylamino group, or a further substituted phenylamino group such as, e.g. an alkylphenyl, alkoxyphenyl or halophenylamino group; a tertiary amino group, e.g. the dimethylamino, diethylamino, di-β-hydroxyethylamino, di-β-cyanoethylamino, ethyl-β-hydroxyethylamino, ethyl-β-chloroethylamino, methylphenylamino or ethylphenylamino, methylbenzylamino or ethylbenzylamino, dibenzylamino or dicyclohexylamino, piperidino, morpholino or piperazino group; an acylamino group such as, e.g. the acetylamino, benzoylamino, carbomethoxyamino or p-toluene sulphonylamino group; the hydroxyl group; and an ether group, preferably a low, possibly further substituted alkoxy group, e.g. the methoxy, ethoxy or β-hydroxyethoxy group.

Y is preferably hydrogen or an alkyl or cycloalkyl radical such as, e.g. the methyl, ethyl, propyl, butyl or cyclohexyl radical.

The rings A and B can contain further substituents, for example nucleophilic groups (preferably in A) such as further secondary or tertiary amino groups, acylamino, hydroxy or ether groups; or electrophilic groups (preferably in B) such as, e.g. carboxylic acid, carboxylic acid ester, carboxylic acid amide or nitrile groups, acyl groups such as, e.g. the acetyl or benzoyl group; sulphonyl groups —SO₂Z, Z being a hydroxyl group, an amino group possibly further substituted at the nitrogen atom, or a hydrocarbon radical possibly further substituted, such as, e.g. the methyl, ethyl, propyl, butyl, cyclohexyl, benzyl or phenyl radical or the radical of another 2,3:6,7-diareno-1-oxa- or 1-thia-4,5-diazepine compound; also nitro groups, the trifluoromethyl group or halogen atoms such as, e.g. fluorine, chlorine or bromine atoms.

In addition, substituents for A and B can be aliphatic groups such as, e.g. the methyl, carboxymethyl or ethyl group, cycloaliphatic groups such as, e.g. the cyclohexyl group, araliphatic groups, e.g. the benzyl group, or aromatic groups such as, e.g. the phenyl group. A and B can also contain fused ring systems, principally isocyclic and then also heterocyclic ring systems such as, e.g. a 6,7-areno-1-osa- or -1-thia-diazepine-2,3-ring.

The o-aminodiaryl compounds of the Formula II are diazotised by the usual methods, advantageously in a hydrochloric acid or sulphuric acid medium. Often, ring closure to the cyclic azo compounds occurs immediately after the diazotisation. In some cases, to accelerate the coupling, the mineral acid diazonium solution must first be buffered with an agent raising the pH value, for example, with alkali hydroxides, alkali carbonates, and, in particular, alkali metal salts of low aliphatic fatty acids such as, e.g. sodium acetate. The coupling products are isolated in the usual way and, if desired, are purified by recrystallisation.

If, as starting materials of the Formula II, compounds are used in which the bridging member R is oxygen, then 2,3:6,7-diareno-1-oxa-4,5-diazepines are obtained. Such o-amino-diaryl ethers usable according to the invention are obtained, for example, by reduction from the corresponding o-nitro-diaryl ethers. The latter are produced for example by reacting o-nitrohalogen aryl compounds with hydroxyaryl compounds by the usual methods.

Examples of o-amino-diaryl ethers usable according to the invention are:

2-amino-3'-methylamino-diphenyl ether,
2-amino-3'-carboxymethylamino-diphenyl ether,
2-amino-3'-ethylamino-diphenyl ether,
2-amino-3'-phenylamino-diphenyl ether,
2-amino-3'-dimethylamino-diphenyl ether,
2-amino-3'-diethylamino-diphenyl ether,
2-amino-3'-di-β-hydroxyethylamino-diphenyl ether,
2-amino-3'-di-β-cyanoethylamino-diphenyl ether,
2-amino-3'-ethyl-β-hydroxyethylamino-diphenyl ether,
2-amino-3'-ethyl-β-chloroethylamino-diphenyl ether,
2-amino-3'-dicyclohexylamino-diphenyl ether,
2-amino-3'-methyl-phenylamino-diphenyl ether,
2-amino-3'-acetylamino-diphenyl ether,
2-amino-3'-benzoylamino-diphenyl ether,
2-amino-3'-p-toluene sulphonylamino-diphenyl ether,
2-amino-3'-carbomethoxyamino-diphenyl ether,
2-amino-3'-hydroxy-diphenyl ether,
2-amino-3'-methoxy-diphenyl ether,
2-amino-3'-ethoxy-diphenyl ether,
2-amino-3',5'-dihydroxy-diphenyl ether,
2-aminophenyl-4'-diethylaminonaphthyl-(2')-ether,
2-amino-4-, -5- or -6-methyl-3'-diethylamino-diphenyl ether,
2-amino-4- or -6-chloro-3'-diethylamino-diphenyl ether,
2-amino-4-acetyl-3'-diethylamino-diphenyl ether,
2-amino-4-benzoyl-3'-diethylamino-diphenyl ether,
2-amino-4-(o-carboxybenzoyl)-3'-diethylamino-diphenyl ether,
2-amino-4-methylsulphonyl-3'-diethylamino-diphenyl ether,
2-amino-5-nitro-3'-diethylamino-diphenyl ether, 2-amino-3′-diethylamino-diphenyl ether-4-sulphonic acid
or -4-carboxylic acid and the amides thereof,
1,3-diamino-4,6-bis-(3′-diethylaminophenoxy)-benzene,
3,3′-diamino-4,4′-bis-(3″-hydroxyphenoxy)-diphenyl sulphone, or
3,3′-diamino-4,4′-bis-(3″-diethylaminophenoxy)-diphenyl sulphone.

If, as starting materials of Formula II, compounds are used in which the bridging member R is sulphur, then 2,3:6,7-diareno-1-thia-4,5-diazepines are obtained. Such o-aminodiaryl thioethers usable according to the invention are obtained for example, by reduction from the corresponding o-nitro-diaryl thioethers. The latter are produced, e.g. by reacting o-nitrohalogen aryl compounds with mercapto aryl compounds by the usual methods.

Examples of o-amino-diaryl thioethers usable according to the invention are:

2-amino-3′-methylamino-diphenyl thioether,
2-amino-3′-phenylamino-diphenyl thioether,
2-amino-3′-dimethylamino-diphenyl thioether,
2-amino-3′-diethylamino-diphenyl thioether,
2-amino-3′-di-β-hydroxyethylamino-diphenyl thioether,
2-amino-3′-(N-methyl-N-phenylamino)-diphenyl thioether,
2-amino-3′-p-toluene sulphonylamino-diphenyl thioether,
2-amino-3′-hydroxy-diphenylthioether,
2-amino-4-, -5- or -6-methyl-3′-diethylamino-diphenyl thioether,
2amino-4- or -6-chloro-diethylamino-diphenyl thioether,
2-amino-4-acetyl-3′-diethylamino-diphenyl thioether,
2-amino-4-benzoyl-3′-diethylamino-diphenyl thioether,
2-amino-4-(o-carboxybenzoyl)-3′-diethylamino-biphenyl thioether,
2-amino-4-methylsulphonyl-3′-acetylamino-diphenyl thioether,
2-amino-5-nitro-3′-diethylamino-diphenyl thioether,
2-amino-3′-diethylamino-diphenyl thioether-4-sulphonic acid or -4-carboxylic acids and their amides,
1,3-diamino-4,6-bis-(3′-diethylaminophenylthio)-benzene,
3,3′-diamino-4,4′-bis-(3″-hydroxyphenylthio)-diphenyl sulphone or
3,3′-diamino-4,4′-bis-(3″-diethylaminophenylthio)-diphenyl sulphone.

If, as starting materials of Formula II, compounds are used in which the bridging member R is a carbonamido or sulphonamido group, then diareno-triazocines are obtained. Such o-aminobenzamides or sulphamides usable according to the invention are obtained by known methods, e.g. by condensing o-nitrobenzoyl or o-nitrosulphonyl chlorides with the corresponding primary or secondary arylamines and then reducing the nitro group.

Examples of o-aminobenzene sulphonic acid or carboxylic acid amides usable according to the invention are:

2-aminobenzene sulphonic acid-N-[3′-(N′,N′-diethylamino)-phenyl]-amide,
2-aminobenzene sulphonic acid or carboxylic acid -N-[3′-(N′,N′-dimethylamino)-phenyl]-N-methylamide,
2-aminobenzene sulphonic acid or carboxylic acid-N-(3′-hydroxyphenyl)-N-ethylamide,
2-amino-5-chlorobenzene sulphonic acid or carboxylic acid-N-(3′-hydroxyphenyl)-N-methylamide,
2-amino-4-chlorobenzene sulphonic acid or carboxylic acid-N-(3′-hydroxyphenyl)-N-methylamide,
2-amino-5-methoxy- or -phenoxy- benzene sulphonic acid or carboxylic acid-N-[3′-(N′,N′-diethylamino)-phenyl]-N-n-butylamide,
2-aminobenzene sulphonic acid or carboxylic acid-N-[3′-(N′-methylamino)-phenyl]-amide, and
2-aminobenzene sulphonic acid or carboxylic acid-N-(3′-hydroxy-4′-carboxyphenyl)-N-methylamide.

The new cyclic azo compounds of Formula I are microcrystalline, yellow to dark brown substances. They can be used as dyestuffs for the dyeing of textile materials. Insofar as they contain water solubilising groups, preferably sulphonic acid groups, they are suitable for the dyeing of keratin material, in particular of wool. Those cyclic azo compounds of Formula I which do not contain water solubilising groups, in particular the diazepines, are preferred. These are suitable as dyestuffs for hydrophobic fibres such as, e.g. polyester fibres. Some oxadiazepines which contain a tertiary amino group as substituent X can also be used in their alkylated form as quaternary amino compounds for the dyeing of polyacrylonitrile fibres.

Of special interest are compounds of the general formula

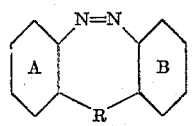

(III)

wherein R is —O—, —S—,

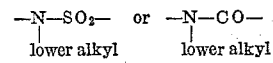

and A and B are each an aryl radical, the A radical containing in the position para to the azo linkage, a nucleophilic X radical, X being especially a secondary amino, a tertiary amino, an acylamino, hydroxyl or alkoxy group. The A and B aryl radicals can be further substituted as described in the foregoing. By "lower" here is meant 1–4 carbon atoms.

Particularly valuable compounds are those of the formula

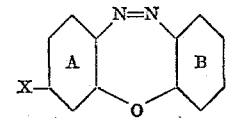

(IV)

wherein X has the meaning given above, the A and B aryl nuclei being further substituted if desired.

A preferred class of compounds are those of formula I wherein R is —O—, —S—,

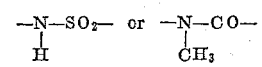

and X is OH or NHCOCH$_3$ and wherein ring B can be further substituted in the position meta to the azo linkage by a chlorine or methyl sulphonyl group.

The following examples illustrate the invention. Where not otherwise stated, the parts are given as parts by weight. The temperatures are in degrees centigrade. The relationship of parts by weight to parts by volume is as that of kilogrammes to litres.

*Example 1*

14.0 parts of 2-amino-4-methylsulphonyl-3′-hydroxy-diphenyl ether are dissolved by warming in 400 parts of water and 25 parts of 35% hydrochloric acid. The solution of 3.5 parts of sodium nitrite in 40 parts of water is added to the above solution while stirring at 0–5°, the addition being made within about 15 minutes. The diazonium compound is poured at 0–10° into a solution of 42 parts of crystallised sodium acetate in 250 parts of water. The reaction mixture is stirred until the coupling is complete for about 1 hour at about 10° and then the reaction product, which has separated in the form of fine yellow-orange crystals, is filtered off, washed with water and dried. 14.0 parts (corresponding to 96% of the theoretical) of a deep yellow compound are obtained, M.P. 236–238°. It is chromatographically uniform.

Analysis of a sample recrystallised from ethylene glycol monoethyl ether corresponds to the formula

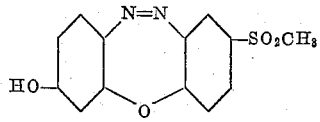

| | Found, percent | Calculated, percent |
|---|---|---|
| C | 53.9 | 53.8 |
| H | 3.49 | 3.44 |
| N | 9.69 | 9.66 |
| S | 11.12 | 11.06 |

The amino-diphenyl ether used as starting material is produced as follows:

23.6 parts of 1-chloro-2-nitrobenzene-4-methyl-sulphone, 16.5 parts of resorcin, 7 parts of anhydrous sodium carbonate and 0.1 part of copper powder in 80 parts of n-amyl alcohol are boiled for 3 hours in an atmosphere of nitrogen. The solvent is removed by steam distillation and the 2-nitro-4-methyl sulphonyl-3'-hydroxydiphenyl ether which separates is recrystallised from water: pale yellow, fine crystals which melt at 147–148°. The corresponding amine is produced from the nitro compound by reduction with iron in aqueous solution according to Béchamp. It can be oxidised and, recrystallised from water, it melts at 133–134°.

If equimolecular amounts of the compounds given in column 1 of the table given below are used as starting compounds and otherwise the procedure is the same as described in the above example, then the oxadiazepines given in column 2 are obtained.

*Example 2*

14.7 parts of 2-amino-4-methylsulphonyl-3'-methoxydiphenyl ether are diazotised under the same conditions as described in Example 1. A solution of sodium carbonate is slowly added to the diazonium compound at 0–5°. The coupling starts at a pH of the mixture of about 6. A sodium carbonate solution is added dropwise until the pH remains constant at about 7. The whole is then stirred for a further hour and the orange-brown reaction product is filtered off. After recrystallising from ethanol, it melts at 128–131°; its composition corresponds to the formula

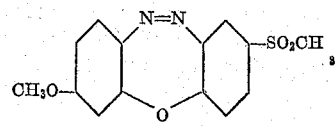

| Starting material | Oxadiazepine | Colour of solution in— | |
|---|---|---|---|
| | | Ethanol | Ethanol+ aqueous caustic soda lye |
| H₂N, HO-, -O- (diphenyl ether) | N=N, HO-, -O- | Yellow | Orange-red. |
| H₂N, HO-, -O-, -Cl | N=N, HO-, -O-, -Cl | do | Do. |
| H₂N, HO-, -O-, -COOH | N=N, HO-, -O-, -COOH | do | Orange. |
| H₂N, HO-, -O-, -SO₃H | N=N, HO-, -O-, -SO₃H | do | Yellow. |
| H₂N, HO-, -O-, CO, HOOC | N=N, HO-, -O-, CO, HOOC | do | Orange. |
| OH, H₂N, HO-, -O-, -SO₂CH₃ | OH, N=N, HO-, -O-, -SO₂CH₃ | Orange | Orange-red. |
| HOOC-, H₂N, HO-, -O-, -Cl | HOOC-, N=N, HO-, -O-, -Cl | Yellow | Orange. |

The diazonium compound used in the above example, in stabilised form, e.g. as zinc complex, can also be brought onto an inert carrier such as paper and the intramolecular azo coupling can be attained by treatment in an alkaline medium. As the diazonium compound is sensitive to light, this method of performing the process according to the invention can be used for photographic copying processes.

The starting material is obtained by the method described in Example 1 by condensing resorcin monomethyl ether with 1-chloro-2-nitrobenzene-4-methyl sulphone.

If equimolecular amounts of the compounds given in column 1 of the table given below are used as starting materials and otherwise the procedure is the same as that described in the above example, then the oxadiazepines given in column 2 are obtained.

occurs and the acid solution turns a deep red colour. After about half an hour, the reaction mixture is made acetous by the addition of an excess of sodium acetate, whereupon the oxadiazepine precipitates in a finely crystalline form. 12.6 parts, corresponding to 73% of the theoretical, of a chromatographically pure product are obtained. It dissolves in alcohol with an orange colour and corresponds to the formula

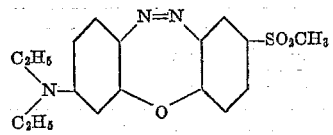

| Starting material | Oxadiazepine | Colour of solution in— | |
|---|---|---|---|
| | | Ethanol | Ethanol+ HCl |
| | | Yellow-orange. | Yellow. |
| | | Orange | Do. |
| | | Yellow-orange. | Do. |
| | | do | Do. |
| | | Yellow | Do. |
| | | Orange | Yellow-orange. |

Example 3

16.7 parts of 2-amino-4-methyl sulphonyl-3'-dimethyl-amino-diphenyl ether are dissolved in 300 parts of water and 25 parts of 35% hydrochloric acid. 50 parts of a 1 N-sodium nitrite solution are then added dropwise at 0–5° within about 10 minutes. An intramolecular coupling of the diazonium compound formed immediately and, recrystallised from methanol, melts at 156–158°. Analysis:

| | Found, percent | Calculated, percent |
|---|---|---|
| C | 59.12 | 59.18 |
| H | 5.51 | 5.31 |
| N | 12.16 | 11.98 |

The starting material is produced by the known method as follows:

Equimolecular amounts of 1-chloro-2-nitrobenzene-4-methyl sulphone and 3-hydroxy-N,N-diethylaminobenzene are reacted in boiling amyl alcohol in the presence of sodium carbonate and a trace of copper. The nitrodiphenyl ether, when isolated in the form of its hydrochloride, melts at 66–68°. It is converted into the corresponding amine by reduction with iron and acid.

If equimolecular amounts of the compounds given in column 1 of the table given below are used as starting materials and otherwise the procedure is as described in the above example, then the oxadiazepines given in column 2 are obtained.

| Starting material | Oxadiazepine | Colour of solution in— | |
|---|---|---|---|
| | | Ethanol | Ethanol+ HCl |
| [structure] | [structure] | Yellow-orange. | Deep orange. |
| [structure] | [structure] | ---do--- | Orange-red. |
| [structure] | [structure] | ---do--- | Do. |
| [structure] | [structure] | Yellow | Do. |
| [structure] | [structure] | ---do--- | Orange. |
| [structure] | [structure] | Orange-red | Red. |
| [structure] | [structure] | Yellow-orange. | Deep red. |
| [structure] | [structure] | Orange | Do. |
| [structure] | [structure] | Red | Violet. |
| [structure] | [structure] | Orange | Orange-red. |
| [structure] | [structure] | Yellow-orange. | Do. |

| Starting material | Oxadiazepine | Colour of solution in— ||
| --- | --- | --- | --- |
| | | Ethanol | Ethanol+HCl |
| (C₂H₅)₂N—⟨⟩—O—⟨⟩(H₂N)—CO—⟨⟩ | (C₂H₅)₂N—⟨⟩—O—⟨⟩(N=N)—CO—⟨⟩ | ___do___ | Deep red. |
| (C₂H₅)₂N—⟨⟩—O—⟨⟩(H₂N)—Cl | (C₂H₅)₂N—⟨⟩—O—⟨⟩(N=N)—Cl | Orange | Do. |
| (C₂H₅)₂N—⟨⟩—O—⟨⟩(H₂N)—COCH₃ | (C₂H₅)₂N—⟨⟩—O—⟨⟩(N=N)—COCH₃ | ___do___ | Red. |
| (C₂H₅)₂N—⟨⟩—O—⟨⟩(H₂N)—SO₂—⟨⟩ | (C₂H₅)₂N—⟨⟩—O—⟨⟩(N=N)—SO₂—⟨⟩ | Yellow-orange. | Do. |
| (C₂H₅)₂N—⟨⟩—O—⟨⟩(H₂N)—NO₂ | (C₂H₅)₂N—⟨⟩—O—⟨⟩(N=N)—NO₂ | Orange-red | Deep red. |

*Example 4*

16.0 parts of 2-amino-4-methylsulphonyl-3'-acetyl-amino-diphenyl ether, M.P. 139–140° (obtained from the corresponding 2-nitrodiphenyl ether by hydrogenation in the presence of Raney nickel) are diazotised under the same conditions as described in Example 3. The diazotisation is complete in about 3 hours, within which time all the hydrochloride which precipitates as diazonium compound dissolves.

The pH of the solution is increased to about 8 to 9 by the addition of sodium carbonate, whereupon the coupling occurs and a brown-red product precipitates.

The oxadiazepine recrystallised from ethylene glycol monoethyl ether of the formula

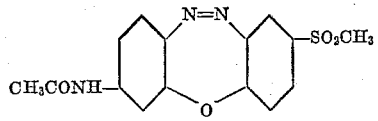

melts at 224–225°. The substance is difficultly soluble in ethanol and, on the addition of hydrochloric acid, there is practically no change of the yellow colour.

If 13.8 parts of 2-amino-4-chloro-3'-acetylaminodiphenyl ether are used as starting material instead of the 2-amino-4-methylsulphonyl-3'-acetylamino-diphenyl ether and otherwise the same procedure as described in the above example is followed, then a yellow-orange product of the formula

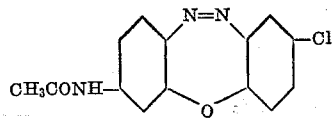

is obtained.

On replacing the acetyl group by a carbomethoxy or a propionyl group, similar compounds are obtained in an analogous manner.

*Example 5*

21.7 parts of 1,3-diamino-4,6-bis-(3'-diethylaminophenoxy)-benzene, obtained by condensing one molecule of 1,3-dichloro-4,6-dinitrobenzene with two molecules of 3-hydroxy-N,N-diethylaminobenzene are dissolved in 500 parts of water and 50 parts of 35% hydrochloric acid. 100 parts of a 1 N-sodium nitrite solution are added dropwise at 0–5° within about 15 minutes. The coupling of the tetrazo compound formed to the corresponding bis-oxadiazepine begins immediately and the solution turns a deep red colour. To complete the coupling, the solution is stirred for about another 12 hours at about 10° and the product is precipitated by the addition of sodium acetate.

In a dry condition, the bis-oxadiazepine of the formula

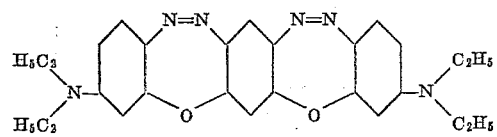

is a red-brown powder which melts at about 140° (on decomposition). It dissolves in ethanol with an orange colour which changes to a deep red on the addition of a little hydrochloric acid.

If instead of the 21.7 parts of 1,3-diamino-4,6-bis-(3'-diethylaminophenoxy)-benzene, 16.2 parts of 1,3-diamino-4,6-bis-(3'-hydroxyphenoxy)-benzene are used, then a product is obtained which dissolves with an orange colour in ethanol. On adding caustic soda lye, the colour changes to red.

*Example 6*

28.6 parts of 3,3'-diamino-4,4'-bis-(3"-diethylaminophenoxy)-diphenyl sulphone are tetrazotised under the same conditions as described in Example 5. After adding an excess of sodium acetate to the reaction mixture, it is stirred for another 12 hours at about 10° to complete the coupling, whereupon the precipitated product is filtered off.

The oxadiazepine of the formula

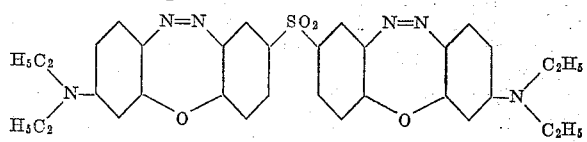

which melts at 159–161°, is an orange-brown powder. It dissolves slightly in ethanol with an orange colour which, on the addition of a little hydrochloric acid, turns deep red.

The starting material is produced analogously to Example 1 from 4,4'-dichloro-3,3'-dinitro-diphenyl sulphone.

If instead of the 28.6 parts of 3,3'-diamino-4,4'-bis-(3''-diethylaminophenoxy)-diphenyl sulphone, 22.2 parts of 3,3' - diamino-4,4'-bis-(3''-hydroxyphenoxy)-diphenyl sulphone are used, then a product is obtained which is difficultly soluble in alcohol and, on the addition of caustic soda lye, dissolves with an orange colour.

*Example 7*

26.4 parts of 2-amino-3'-hydroxy-diphenylthioether are dissolved in 900 parts by volume of 60% acetic acid and 150 parts by volume of 35% hydrochloric acid. The solution of 8.5 parts of sodium nitrite in 60 parts of water is added to this solution within about 15 minutes while stirring at 0–5°. About 1100 parts by volume of 30% caustic soda lye are poured into the diazonium salt solution at 0–10° so that the pH of the solution rises to 6–7. The coupling is completed by stirring the reaction mixture for about another 2 hours at 10° after which the red-orange reaction product is filtered off, washed with water and dried. The yield of crude product is 94% of the theoretical. Pure 2,3:6,7-diareno-1-thia-4,5-diazepine of the formula given below is easily obtained from the crude product by chromatographic separation in an aluminium oxide column. The compound, which is an intensively red coloured powder, dissolves in ethanol and in acetone with an orange-yellow colour and in chloroform with a red-orange colour. It is only slightly soluble in benzene and almost insoluble in hot water. The colour of the solution in acetic acid is yellow and in dilute caustic soda lye intensive orange. Elementary analysis corresponds to the formula

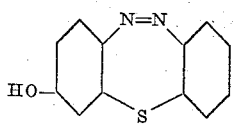

|  | C, percent | H, percent | N, percent | S, percent |
|---|---|---|---|---|
| Found | 62.8 | 3.4 | 12.2 | 14.3 |
| Calculated | 63.1 | 3.5 | 12.3 | 14.05 |

The 2-amino-3'-hydroxy-diphenylthioether used as starting material is produced in the following manner:

25 parts of m-aminothiophenol are dissolved in 830 parts by volume of 0.5 N-caustic soda lye. 34 parts of o-nitrochlorobenzene in 400 parts by volume of ethanol are poured in and the mixture is refluxed for 4 hours in an atmosphere of nitrogen. It is then distilled through a sloping condenser until 200 parts by volume of distillate have been removed. The temperature is then reduced to 60° and the mixture is acidified with hydrochloric acid. The temperature is reduced to 5° and the pale yellow hydrochloride formed is filtered off under suction. To remove o-nitrochlorobenzene adhering thereto, 250 parts by volume of 17% hydrochloric acid are added to the crude product which is then treated with steam until no more o-nitrochlorobenzene passes over. The hydrochloride of 2-nitro-3'-amino-diphenylthioether obtained in this way is pure and melts at 174–175°. The corresponding base is obtained in a pure form by treating the hydrochloride with excess 0.5 N-caustic soda lye at 40–50°. It melts at 130–131°.

To produce the 2-nitro-3'-hydroxy-diphenylthioether, 34 parts of the hydrochloride previously mentioned are placed in 100 parts by volume of concentrated sulphuric acid. The equivalent amount of nitrosyl sulphuric acid is added dropwise to this solution within 30 minutes at 0–5°. The solution is stirred another 3 hours at 0–5° to complete the diazotisation.

The diazonium salt is decomposed by adding the solution dropwise to 260 parts of water and 40 parts by volume of concentrated sulphuric acid at 90–100°. The crude product is worked up by crystallisation from aqueous ethanol. The pure compound is obtained in this way in the form of lustrous golden yellow platelets which melt at 112–113°.

The corresponding amine is produced from the nitro compound either by reduction with hydrogen in the presence of Raney nickel or with iron according to Béchamp.

Similar 2,3:6,7-diareno-1-thia-4,5-diazepines are obtained by the method described in the first paragraph of this example if, instead of 26.4 parts of 2-amino-3'-hydroxy-diphenylthioether, 30.6 parts of 2-amino-4-chloro-3'-hydroxy-diphenylthioether or 34.6 parts of 2-amino-4 - methylsulphonyl-3'-hydroxy - diphenylthioether or 36 parts of 2-amino-3'-hydroxy-diphenylthioether - 4 - sulphonic amide are used.

*Example 8*

7.5 parts of 2-amino-3'-dimethylamino-diphenylthioether are dissolved in 400 parts by volume of 60% acetic acid and 60 parts by volume of 35% hydrochloric acid. The solution is diazotised by the dropwise addition of a solution of 2.2 parts of sodium nitrite in 16 parts of water at 0–5°. The pH of the diazonium salt solution is then increased to 6–7 by the addition of caustic soda lye at 0–10°, whereupon the coupling occurs. The whole is stirred for another hour and then the orange-brown reaction product is filtered off.

The yield of crude product is 97.5% of the theoretical. The pure compound is obtained by extraction with ethanol. It crystallises from ethanol in the form of very small orange-coloured crystals and, after removal of the crystal ethanol, it melts at 120–121°. Elementary analysis corresponds to the formula

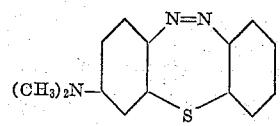

|  | C, percent | H, percent | N, percent | S, percent |
|---|---|---|---|---|
| Found | 65.6 | 5.2 | 16.5 | 12.3 |
| Calculated | 65.9 | 5.1 | 16.5 | 12.6 |

Dissolved in ethanol, the colour is an intensive yellow: $\lambda_{max}$: 450 m$\mu$. The base dissolves in dilute acetic acid and in hydrochloric acid with an intensive ruby red colour.

The 2-amino-3'-dimethylamino-diphenylthioether used as starting material is obtained from 2-nitro-3'-amino-diphenylthioether by methylating with p-toluene sulphonic acid methyl ester and heating to 110–120°. The product, recrystallised from ethanol, consists of brown-yellow crystals which melt at 90–91°.

The 2-amino-3'-dimethylamino-diphenylthioether is obtained therefrom in quantitative yield by reduction of the nitro group by the methods given in Example 7.

Similar 2,3:6,7-diareno-1-thia-diazepines are obtained by the same process if, instead of 7.5 parts of 2-amino-3'-dimethylamino-diphenylthioether, 9.9 parts of 2-amino-4-methyl-sulphonyl-3'-ethylamino-diphenylthioether or 9.9 parts of 2-amino-4-methylsulphonyl-3'-dimethylamino-diphenylthioether or 11.5 parts of 2-amino-3'-diethylamino-diphenylthioether-4-sulphonic acid diethylamide or 9.4 parts of 2-amino-3'-benzylamino-diphenylthioether or 9.4 parts of 2-amino-4-chloro-3'-diethylamino-diphenylthioether are used.

*Example 9*

3.4 parts of 2-amino-4-methylsulphonyl-3'-acetylamino-diphenylthioether are dissolved in 120 parts by volume of 60% acetic acid and 20 parts by volume of 35% hydrochloric acid. 0.7 part of sodium nitrite in 5 parts of water is added dropwise while stirring at 0–5°. To start the coupling, finely crushed ice is added to the diazonium salt solution and the pH is increased by the careful addition of 30% caustic soda lye to 7–8. The coupling is completed by stirring at 0–10° for another 2 hours whereupon the brown-red coloured thiadiazepine is filtered off, washed with water and dried at 40–50° under vacuum. The pure compound is obtained by chromatographic separation in an aluminium oxide column. The intensively red-coloured compound of the formula

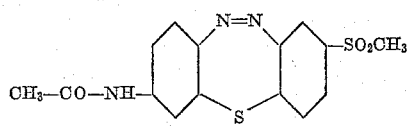

dissolves in alcohol with a red-orange colour; $\lambda_{max}$: 490 m$\mu$.

On the addition of hydrochloric acid, the colour of the alcoholic solution changes from red-orange to yellow-orange. The substance is almost insoluble in chloroform and benzene but on the other hand it dissolves easily in acetone.

The 2-amino-4-methylsulphonyl-3'-acetylamino-diphenylthioether used as starting material is produced in the following manner:

100 parts of 1-methylsulphonyl-3-nitro-4-chlorobenzene in 1500 parts of ethanol are poured into a solution of 50 parts of m-aminothiophenol in 1500 parts by volume of 0.5 N-caustic soda lye. The mixture is refluxed for 2½ hours in an atmosphere of nitrogen. The contents of the flask are then cooled to 5° and the 2-nitro-4-methylsulphonyl-3'-amino-diphenylthioether is filtered off under suction. The pure compound is obtained by crystallising the crude product from ethanol. It melts at 181–182°.

The 2-nitro-4-methylsulphonyl-3'-amino-diphenylthioether is acetylated with acetic acid anhydride. The 2-nitro-4-methylsulphonyl-3'-acetylamino-diphenylthioether crystallises from ethylene glycol monoethyl ether in the form of pale yellow, very fine crystals which melt at 248–249°.

A high yield of 2-amino-4-methylsulphonyl-3'-acetylamino-diphenylthioether is obtained from the nitro compound described by reduction with hydrogen in the presence of Raney nickel.

If the amino group of the 2-nitro-4-methylsulphonyl-3'-amino-diphenylthioether is substituted by a propionyl or isobutyryl radical, then similar 2,3:6,7-diareno-1-thia-4,5-diazepines are obtained.

*Example 10*

16.0 parts of a compound of the formula

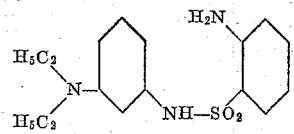

are dissolved in 600 parts of water and 500 parts of concentrated hydrochloric acid. 50 parts of 1 N-sodium nitrite solution are added within 30 minutes to this solution at 0–5° while stirring and then sodium acetate is slowly added until the reaction solution has a pH of about 4. The reaction product precipitates in the form of fine, orange crystals which are filtered off and washed with water. The yield of reaction product is 92% of the theoretical. It dissolves in dilute hydrochloric acid with a pale orange-red colour. To obtain the pure substance for analysis, the crude product is ground with benzene which contains 10% of methanol, the red crystalline residue is filtered off and recrystallised from chlorobenzene. Elementary analysis corresponds to the formula

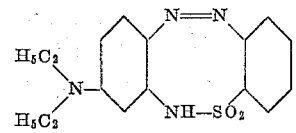

| | C, percent | H percent | N percent | S, percent |
|---|---|---|---|---|
| Found | 58.0 | 5.46 | 16.4 | 9.77 |
| Calculated | 58.2 | 5.45 | 16.9 | 9.70 |

The sulphonic acid anilide used as starting material is produced in the following manner:

Molecular amounts of o-nitrobenzene sulphonic acid chloride and 1-N,N-diethylamino-3-aminobenzene in an aqueous suspension are condensed at 60–80° and the pH of the reaction mixture is kept between 5–6 by the continuous addition of an acid binding agent.

The nitro compound so obtained, when recrystallised from alcohol, melts at 137–138° and can be converted by reduction in aqueous/alcoholic solution with iron according to Béchamp into the amine. This can be isolated as the hydrochloride which melts at 224–225°.

A similar product is obtained if, in the above example, 17.0 parts of a compound of the formula

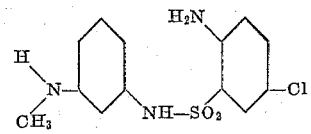

are used as starting material. The triazocine obtained is fairly difficultly soluble in ethanol. The solution is yellow-orange coloured and there is only a slight change in colour on the addition of hydrochloric acid.

*Example 11*

16.6 parts of a compound of the formula

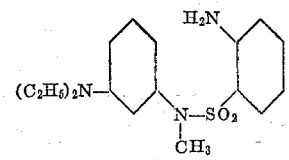

are dissolved in dilute hydrochloric acid and diazotised as described in Example 10. Sodium acetate solution is then added dropwise to the clear, pale yellow solution of the diazonium compound until a pH of about 4–5 is obtained. The reaction is completed by slowly raising the temperature to 20–25° over a period of some hours and the product is isolated in the usual way by filtration under suction. 14.5 parts of a red preparation are obtained which, after recrystallisation from a mixture of chlorobenzene/ligroin, is chromatographically uniform and has a melting point of 175–179°. It corresponds to the formula

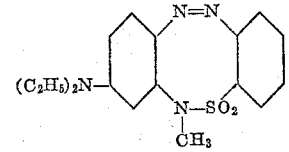

The starting material is produced by the known method as follows:

34.9 parts of the compound described in example 10 of the formula

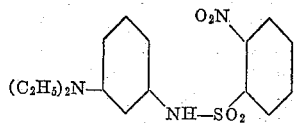

are dissolved in 180 parts of water with the addition of caustic soda lye. 20 parts of dimethyl sulphate are added dropwise to this solution within 2 hours, the reaction mixture always being kept alkaline by the addition of caustic soda lye and the methylation product is isolated. From dilute ethanol, it crystallises in yellow needles which melt at 113–115°. The corresponding amine is obtained by reducing the nitro compound in the usual way.

If, in the above example, 19.4 parts of a compound of the formula

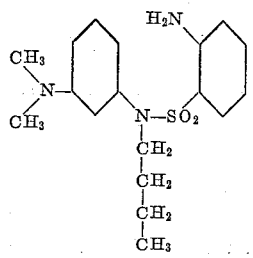

are used as starting material, then an orange-red product is obtained which dissolves very easily in ethanol. The solution has an orange colour which, on the addition of hydrochloric acid, changes to deep orange-red.

*Example 12*

13.2 parts of a compound of the formula

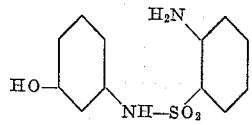

are diazotised as described in example 10 and the diazonium compound is coupled to form the cyclic azo compound by the addition of sodium acetate.

The product which precipitates in the form of fine yellow-orange crystals is filtered off, dissolved in dilute sodium carbonate solution, some insoluble residue is filtered off and the product is again precipitated from the filtrate by the addition of acid.

It corresponds to the formula

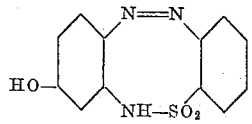

melts at 225° on decomposition, and dissolves in alkali with an orange colour.

The starting material is produced by condensing analogously to the process described in Example 10, molecular amounts of o-nitrobenzene sulphonic acid chloride and 3-amino-1-hydroxybenzene and isolating the nitro compound in the usual way. It can be recrystallised from water and melts at 114–116°. The corresponding amine is obtained therefrom by reduction in the usual way. If, in the above example, 18.5 parts of a compound of the formula

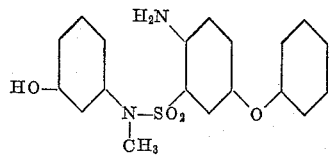

are used as starting material and the procedure given in the above example is followed, then an orange product is obtained which is soluble in dilute caustic soda lye with a red colour.

*Example 13*

15.4 parts of a compound of the formula

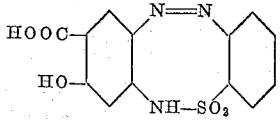

are diazotized as described in Example 10. Sodium carbonate solution is slowly added dropwise to the solution of the diazonium compound at 0–10° until a pH of about 7 is attained. To complete the coupling the whole is stirred for some hours at ambient temperature and the reaction mixture is made acid with hydrochloric acid. The orange-brown product which precipitates is filtered off. It dissolves in aqueous alkalies with an orange colour, melts at 255–257° on decomposition, and corresponds to the formula

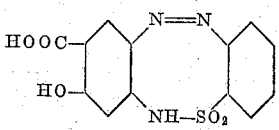

The starting material is obtained by condensing 2-hydroxy-4-aminobenzene carboxylic acid with 2-nitrobenzene sulphonic acid chloride and then reducing analogously to the process described in Example 10. The nitro compound melts at 192–194°, and the corresponding amine, in the form of the hydrochloride, melts at 202° on decomposition.

If in the above example, 17.1 parts of a compound of the formula

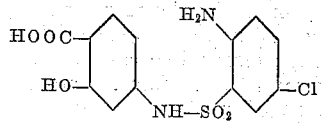

are used as starting material, then a brown, finely crystalline product is obtained which dissolves in dilute caustic soda lye with a yellow colour.

*Example 14*

14.8 parts of a compound of the formula

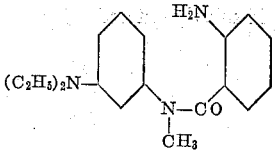

are diazotized as described in Example 10. An excess of sodium acetate is added to the yellow solution of the diazonium compound and the whole is left to react for some hours at about 20°.

A chromatographically uniform, brown-orange product (M.P. 180–184°) of the formula

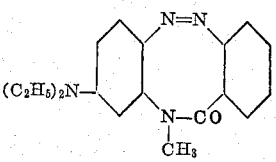

is obtained. It dissolves in dilute hydrochloric acid with a deep orange colour.

The starting material is produced by known methods by, for example, condensing 2-nitrobenzene carboxylic acid chloride and 1-methylamino-3-diethylaminobenzene in the presence of pyridine and of chlorobenzene as solvent for 12 hours at 70° to 80°. After distilling off the solvent, the precipitated reaction product is isolated in the usual way and reduced to the corresponding amine.

If the procedure described above is followed but 12.1 parts of a compound of the formula

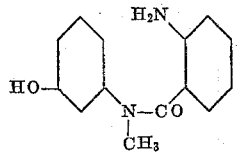

or the corresponding amount of the analogous N-ethyl-amide compound are used, then yellow-orange products are obtained which dissolve in dilute caustic soda lye with an orange-red colour.

What we claim is:

1. A compound of the formula

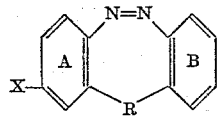

wherein

X is a member selected from the group consisting of hydroxyl, mono-methoxy, mono-ethoxy, mono-($\beta$-hydroxyethoxy), mono-acetylamino, mono-benzoylamino, mono - methoxycarbonylamino, mono-p-toluene sulfonylamino, mono - alkylamino with maximally 5 carbon atoms, mono-carboxymethylamino, mono-cyclohexylamino, mono-benzylamino, mono-phenylamino, mono-methylphenylamino, dimethylamino, diethylamino, di-$\beta$-hydroxyethylamino, di-$\beta$-cyano-ethylamino, ethyl-$\beta$-hydroxyethylamino, ethyl-$\beta$-chloroethylamino, methylphenylamino, ethylphenylamino, methylbenzylamino, ethylbenzylamino, dibenzylamino, dicyclohexylamino, piperidino, morpholino, and piperazino;

R is a member selected from the group consisting of oxygen and sulfur;

the benzene nucleus A is a member selected from the group of a benzene nucleus unsubstituted apart from the substituent X, and a benzene nucleus further substituted with a member selected from the group consisting of hydroxy, carboxyl and one benzene nucleus condensed with ring A ortho to the X substituent and the benzene nucleus B is a member selected from the group consisting of unsubstituted benzene and a benzene nucleus substituted with an electrophilic group selected from the group consisting of methyl, chloro, bromo, fluoro, acetyl, benzoyl, carboxybenzoyl, lower alkylsulfonyl, cyclohexylsulfonyl, benzylsulfonyl, phenylsulfonyl, nitro, —SO$_3$H, —SO$_2$NH$_2$, —SO$_2$—NH—phenyl, —COOH, —CO—NH$_2$, and trifluoromethyl.

2. A cyclic azo compound of the formula

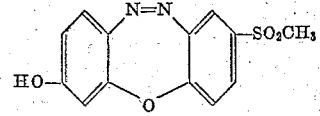

3. A cyclic azo compound of the formula

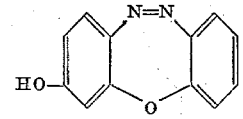

4. A cyclic azo compound of the formula

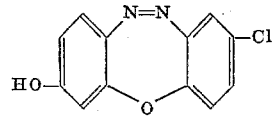

5. A cyclic azo compound of the formula

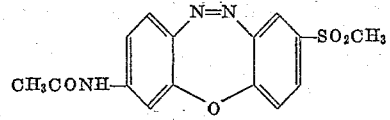

6. A cyclic azo compound of the formula

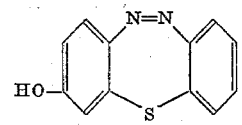

7. A cyclic azo compound of the formula

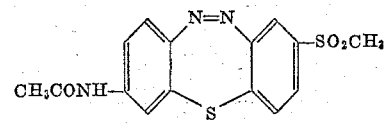

No references cited.